United States Patent [19]

Deviny et al.

[11] 4,395,000

[45] Jul. 26, 1983

[54] LATCH AND LOCK MECHANISM FOR AN AIRCRAFT CARGO DOOR ASSEMBLY

[75] Inventors: James E. Deviny, Redmond; Miloslav Puncoch, Seattle, both of Wash.

[73] Assignee: The Boeing Company, Seattle, Wash.

[21] Appl. No.: 307,178

[22] Filed: Sep. 30, 1981

[51] Int. Cl.³ ............................ B64C 1/14; E05C 1/08
[52] U.S. Cl. ............................... 244/118.3; 244/129.5; 292/144; 292/150; 292/157; 292/DIG. 21
[58] Field of Search ............... 244/118.3, 129.4, 129.5, 244/129.6; 49/279, 366, 367, 368, 369, 394; 292/144, 150, 157, 252, DIG. 21

[56] References Cited

U.S. PATENT DOCUMENTS 4,005,886  2/1977  Lirette ........................ 292/DIG. 21
4,097,009  6/1978  Barnes .............................. 244/129.5

FOREIGN PATENT DOCUMENTS 159740  3/1940  Fed. Rep. of Germany ...... 292/157

*Primary Examiner*—Galen L. Barefoot
*Assistant Examiner*—Rodney Corl

*Attorney, Agent, or Firm*—Christensen, O'Connor, Johnson & Kindness

[57] ABSTRACT

A latch and lock mechanism for an aircraft cargo door assembly is disclosed. The mechanism is adapted to a cargo door assembly of the type having an outwardly opening, nonplug-type cargo ramp and an inwardly opening, plug-type cargo door hinged to opposite sides of a doorway so as to form a two-part closure member in coplanar alignment with the airplane fuselage when the door assembly is closed. The latch and lock mechanism preferably includes a plurality of latch units that secure the cargo ramp in its closed position. The latch units are connected through a cam-actuated interlock mechanism to the plug-type cargo door. The interlock mechanism is such that the cargo ramp latches can only be actuated when the cargo door is in an open position, and further such that the cargo door cannot be closed unless the cargo ramp latches are in a latched position. The interlock mechanism precludes the possibility of inadvertent unlatching of the cargo ramp while the airplane is pressurized and in flight, and also prevents the possibility of inadvertently leaving the cargo ramp in a closed but unlatched state during pressurization of the cabin.

14 Claims, 8 Drawing Figures

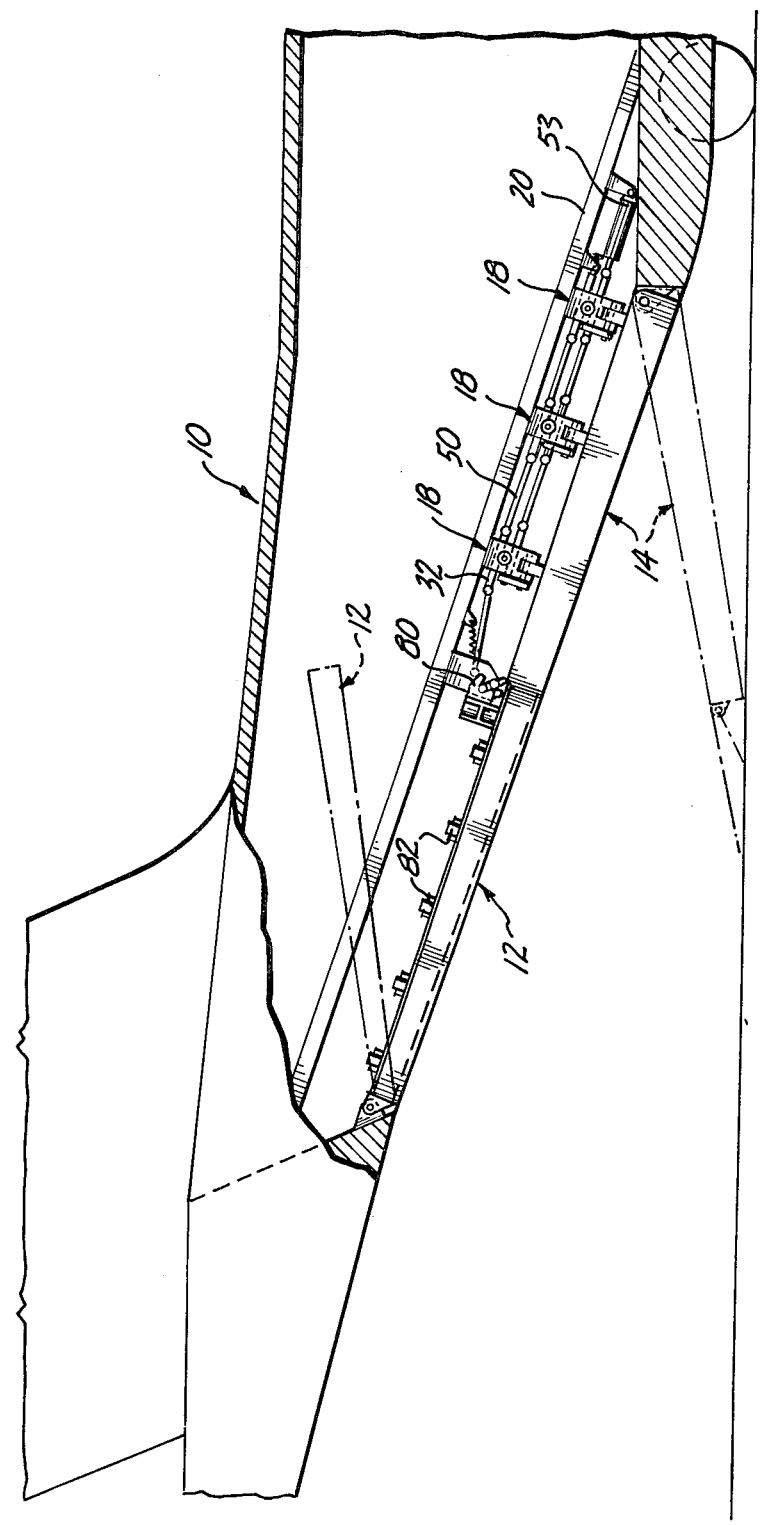

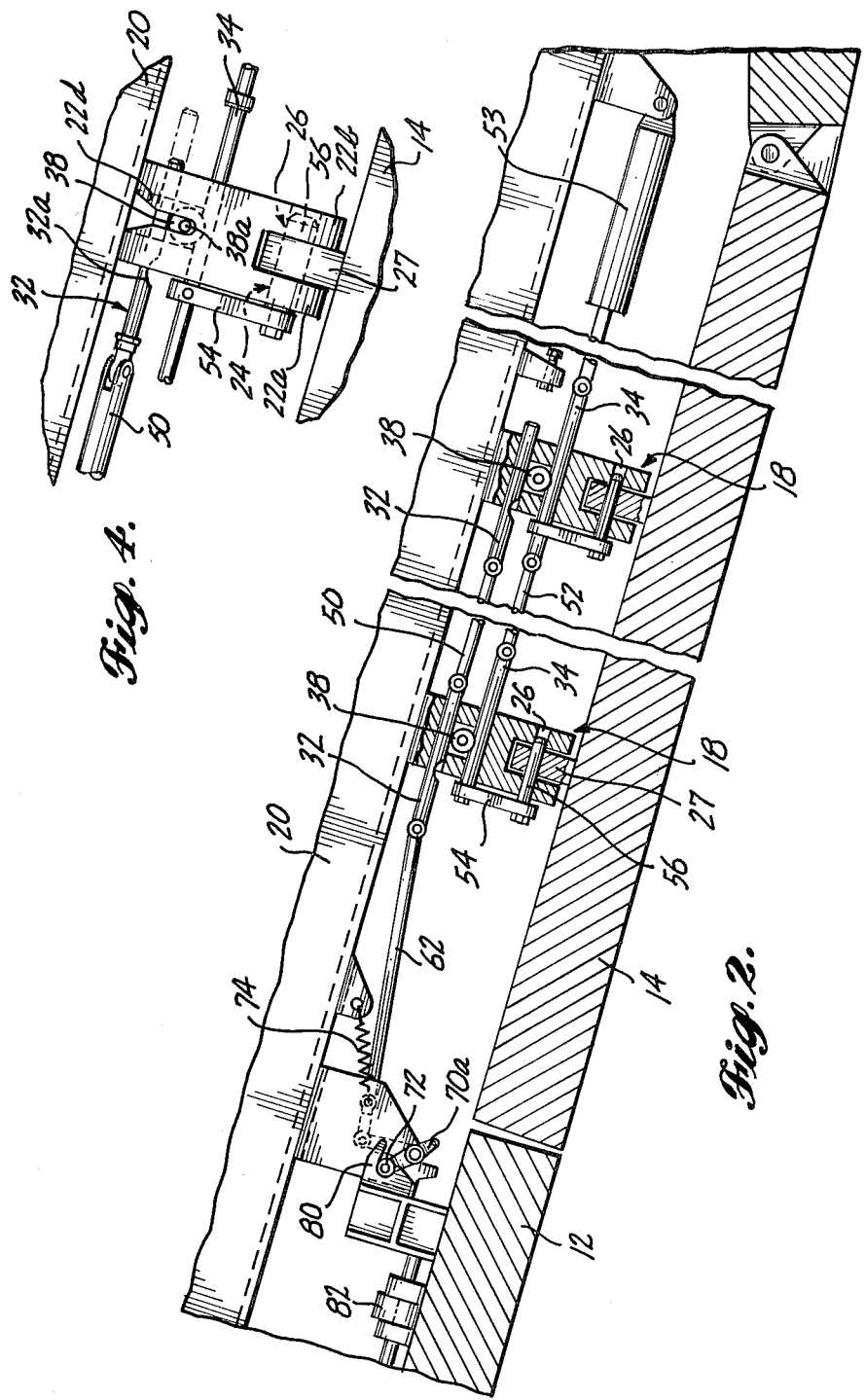

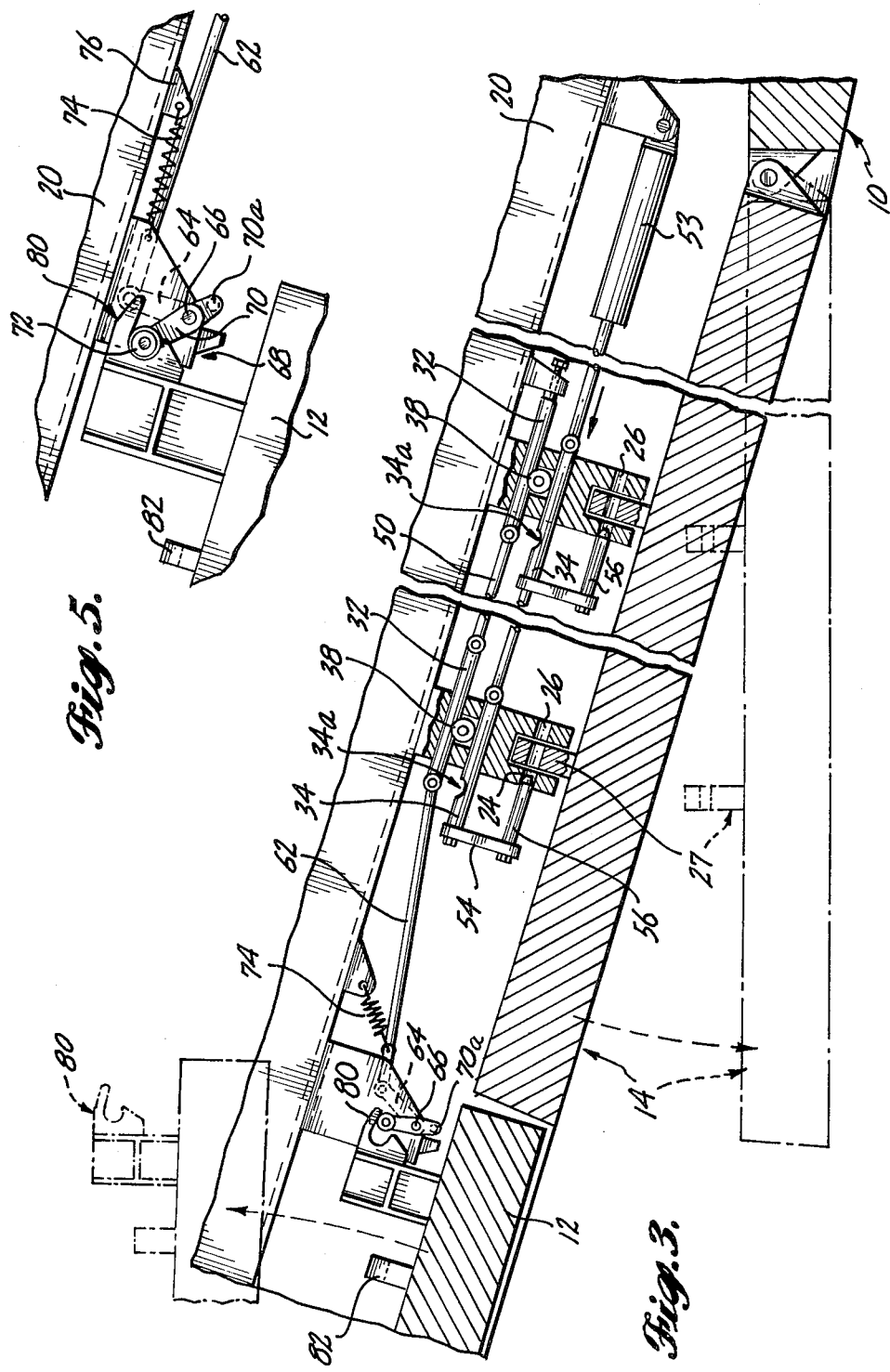

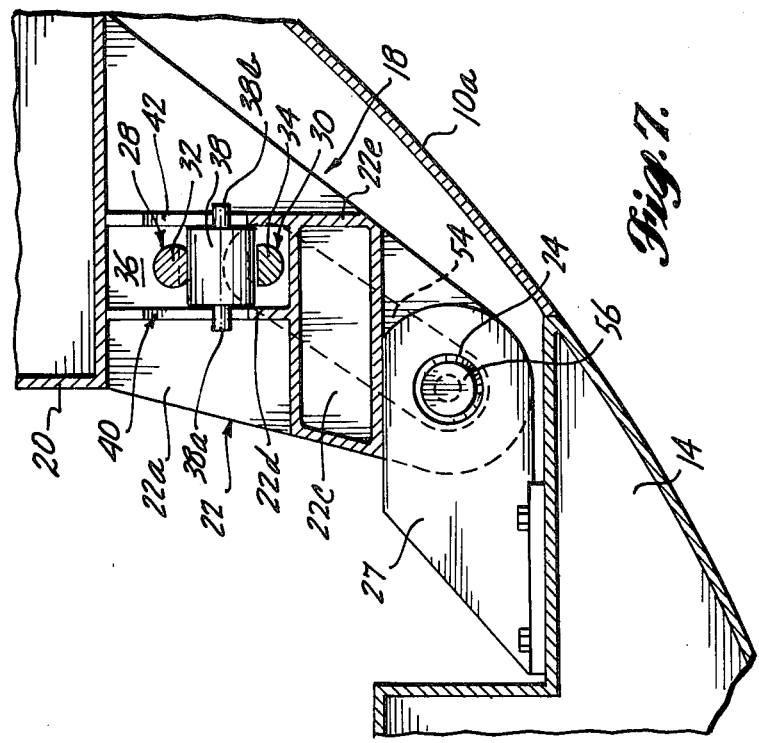
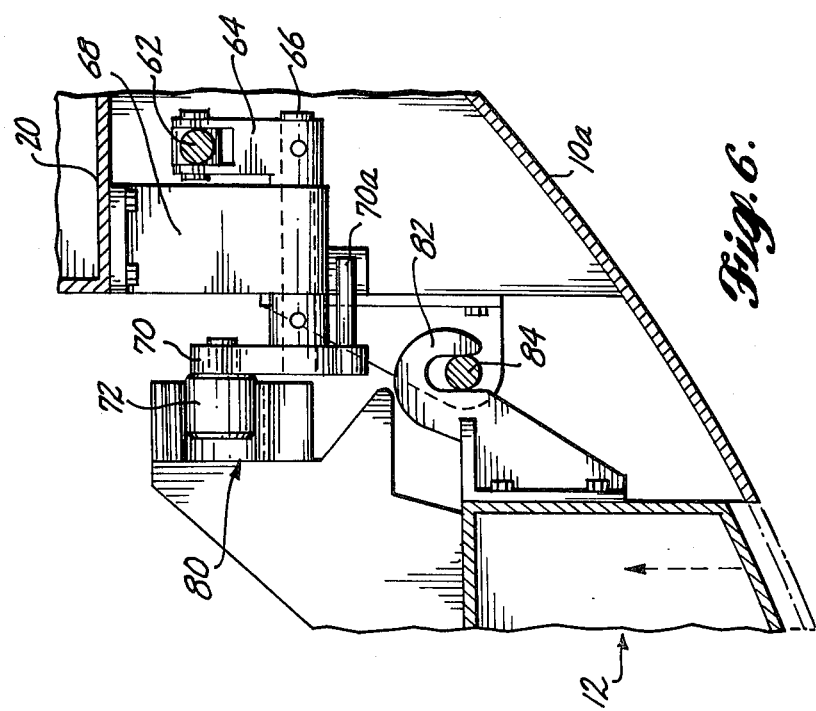

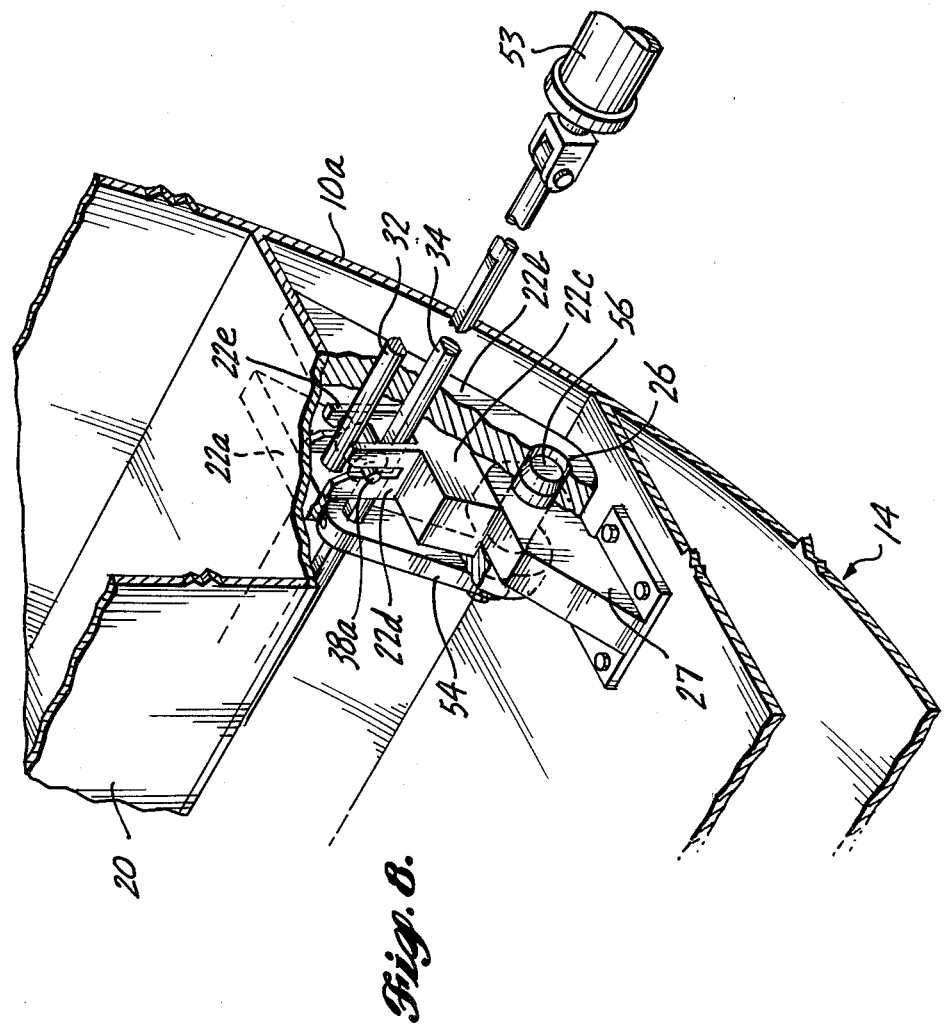

LATCH AND LOCK MECHANISM FOR AN AIRCRAFT CARGO DOOR ASSEMBLY

BACKGROUND OF THE INVENTION

The present invention is related generally to latch and lock mechanisms for doors, and more particularly, to latch and lock mechanisms for aircraft cargo door assemblies.

Certain cargo transport airplanes include a central bay cargo door assembly in the underside of the fuselage. The doorway opens downwardly and rearwardly from the rear of the airplane where the underside of the fuselage slopes upwardly to the tail section, such that cargo and vehicles may be loaded into the fuselage from directly behind the airplane. The particular type of door assembly to which the present invention is directed is formed in two parts: a cargo ramp hinged to the fuselage at the forward, or lower, edge of the doorway; and a cargo door hinged to the fuselage at the upper, rear edge of the doorway. With the door assembly closed, the cargo ramp and the cargo door meet in the middle of the doorway in coplanar alignment so as to form a two-part, pressure-tight closure member. To open the door assembly for loading and unloading cargo, the cargo ramp is swung downwardly to extend to the ground, and the cargo door is swung upwardly into the overhead space in the rear of the fuselage. The cargo door is swung upwardly in such a manner to provide adequate vertical clearance for vehicles entering and exiting the airplane on the cargo ramp. Since the cargo door swings inwardly, it is ordinarily a plug-type door, whereas the outwardly swinging cargo ramp is necessarily a nonplug-type closure member.

Failure of an aircraft door latch mechanism during flight, or inadvertent unlatching during flight due to human error, can result in the cabin pressurization and the outside airstream blowing the door open with sufficient force to damage the door and impair the stability of the airplane. Several catastrophic accidents have in fact been caused in recent years by the unexpected and violent opening of aircraft door assemblies during flight. These accidents have resulted from various causes, including mechanical failures of the door latch mechanisms as well as human errors, such as inadvertently leaving cargo doors in closed but unlatched positions prior to takeoff. These failures have prompted a search for a safe, simple, and reliable latch and lock mechanism for the above-described type of cargo door assembly.

Accordingly, it is an object and purpose of the present invention to provide a safe, simple and reliable latch and lock mechanism in an airplane door assembly having an outwardly opening closure member, such as a loading ramp, and an inwardly opening door member.

It is also an object to provide such a door assembly having a latch and lock mechanism that includes a mechanical interlock between the cargo door and cargo ramp, such that the cargo door cannot be inadvertently closed when the cargo ramp is in a closed but unlatched position. It is also an object to provide such a latch and lock mechanism wherein the mechanical interlock between the cargo door and cargo ramp is independent of the latch mechanism for the cargo ramp.

It is another object to provide a latch and lock mechanism that positively prevents the cargo ramp from being unlatched until the fuselage cabin has been depressurized and the cargo door has been unlatched and at least partially opened.

SUMMARY OF THE INVENTION

In accordance with the invention, there is provided an aircraft door assembly including a latch and lock mechanism that positively prevents pressurization of the airplane until the door assembly is closed and latched. The latch and lock mechanism is particularly adapted to a cargo door assembly of the type having an outwardly opening, nonplug-type cargo ramp or other closure member, and an inwardly opening, plug-type cargo door.

The latch and lock mechanism includes one or more latches that operate to selectively secure the outwardly opening cargo ramp in its closed position to fixed structure of the airplane. Preferably, there are a plurality of such latches spaced along the opposite sides of the doorway. The latches are mechanically actuated by respective latch actuator rods, which are linked together so as to be driven conjointly. The latch actuator rods will ordinarily be hydraulically actuated and remotely controlled, although any suitable actuating means may be used. Opening and closing of the latches by means of the latch actuator rods is controlled, however, by a mechanical interlock between the latch actuator rods and the cargo door. The mechanical interlock, described further below, operates to positively prevent the cargo ramp from being unlatched while the cargo door is closed, and also operates to positively prevent the cargo door from being closed with the cargo ramp in a closed, but unlatched, state.

The mechanical interlock between the cargo door and the cargo ramp latches preferably comprises a set of cam-actuated lock actuator rods that are associated respectively with each of the cargo ramp latches. The lock rods along each side of the doorway are linked together so as to be actuated conjointly. In the preferred embodiment, the lock rods are connected to a cam mechanism that is actuated by the cargo door. The cam mechanism includes a pair of cams affixed to the cargo door and a pair of cooperable cam followers pivotably mounted to fixed structure of the fuselage. The cam followers are connected to the lock rods so as to actuate the lock rods in response to opening and closing of the cargo door. The lock rods interlock with the latch actuator rods through an interlock cam associated with each latch unit. The interlock cams operate to lock the associated latch actuator rods with their respective latches in a latched state when the cargo door is closed, and further operate to release the latch actuator rods and associated latches so as to permit the latches to be selectively latched or unlatched when the cargo door is open.

With the latch and lock mechanism just described, the cargo door must always be opened first and closed last. Since the cargo door is a plug-type door, whereas the cargo ramp is a nonplug-type closure member, this effectively prevents any inadvertent attempt to close the cargo door assembly and pressurize the fuselage cabin while the cargo ramp is left unlatched. Also, the cargo ramp cannot be inadvertently opened during flight while the fuselage cabin is pressurized, since the cargo ramp cannot be unlatched until the cargo door has been opened, and further because the cargo door cannot be opened unless the fuselage cabin has been depressurized. These and other advantageous features of the latch and lock mechanism are described in further detail below with reference to the accompanying illustrations of a preferred embodiment.

BRIEF DESCRIPTION OF THE DRAWINGS

FIG. 1 is a schematic side view in partial cross section of the rear fuselage portion of a transport airplane having a cargo door assembly equipped with the preferred embodiment of the latch and lock mechanism of the present invention;

FIG. 2 is a side view in partial cross section of a portion of the latch and lock mechanism, shown in a latched and locked position;

FIG. 3 is a side view as in FIG. 2, with the latch and lock mechanism shown in an unlatched and unlocked position;

FIG. 4 is an enlarged side view of one latch unit;

FIG. 5 is an enlarged side view of one of two cam units actuated by the cargo door;

FIG. 6 is an end view of the cam unit of FIG. 5;

FIG. 7 is an end view in cross section of the latch unit shown in FIG. 4;

FIG. 8 is an isometric view of the latch unit shown in FIGS. 4 and 7.

DETAILED DESCRIPTION OF THE PREFERRED EMBODIMENT

FIG. 1 illustrates a preferred embodiment of the latch and lock mechanism of the present invention as it is installed in a bay cargo door assembly of a large transport airplane. The cargo door assembly includes two closure members that are hinged to the airplane fuselage 10 at opposite ends of the doorway. The closure members are a cargo door 12, which opens upwardly and inwardly into the fuselage, and a cargo ramp 14 that opens outwardly and downwardly. When closed, the cargo door 12 and the ramp 14 meet in the middle of the doorway in coplanar alignment so as to form a two-part closure member for the cargo doorway. The door assembly is formed at the rear of the airplane where the fuselage underside slopes rearwardly and upwardly, such that cargo can be loaded and unloaded from directly behind the airplane. The cargo door 12, being an inwardly swinging door, is a plug-type door, whereas the outwardly swinging cargo ramp 14 is necessarily a nonplug-type of aircraft closure member.

During loading and unloading of cargo, particularly motor vehicles, the cargo ramp 14 is swung downwardly to the ground to permit vehicles to enter and leave the fuselage 10 of the airplane, as shown in phantom outline in FIG. 1. The cargo door 12 is swung inwardly and upwardly into the overhead space inside the fuselage 10 in order to provide adequate vertical clearance for vehicles on the cargo ramp 14. In another mode of operation used in airdrop operations, the cargo ramp 14 may be deployed in a substantially horizontal position while the airplane is in flight to permit personnel or equipment to be discharged from the airplane through the cargo doorway.

The cargo ramp 14 is secured in its closed position by means of a plurality of latch units 18. As described further below, each latch unit 18 includes a cam interlock mechanism by which latching and unlatching of the cargo ramp 14 is interlocked with the cargo door 12. The latch units 18 are affixed to a pair of structural longerons 20 that extend along the opposite sides of the doorway and form structural elements of the fuselage 10. It will be understood that there are identical longerons 20 along each side of the doorway, with multiple latch units 18 affixed to each longeron, although only one side of the door assembly is shown in FIGS. 1 through 3. In one preferred embodiment, for example, there are ten latch units 18 along each side of the cargo ramp 14. Three latch units 18 are shown in exaggerated size in FIG. 1, however, for illustrative purposes. The latch units 18 are substantially identical to one another, and will therefore be described further below by reference to a single latch unit 18 such as those illustrated in FIGS. 2 through 4, 7 and 8.

Referring to FIGS. 2 through 4, 7 and 8, each latch unit 18 includes a latch body 22 that is affixed to the underside of the longeron 20 so as to extend downwardly and inwardly adjacent the doorway of the fuselage 10. The latch body 22 is of unitary construction and may be described as having a pair of parallel, spaced-apart generally triangular sideplates 22a and 22b joined together by an integral cross-member 22c (best shown in FIGS. 7 and 8). The latch body 22 is affixed to the underside of the longeron 20 along parallel upper edges of the sideplates 22a and 22b, such that triangular apexes of the sideplates 22a and 22b extend generally downwardly and inwardly from the longeron 20 adjacent the fuselage skin 10a.

The latch body 22 extends into the doorway such that its lower apex terminates adjacent the inside surface of the cargo ramp 14 when the ramp 14 is in its closed position. The downwardly extending, spaced-apart apexes of the sideplates 22a and 22b include coaxial bores 24 and 26 so as to form a clevis. The cargo ramp 14 includes a plurality of bosses 27, each of which includes a transverse bore and which is positioned so as to be inserted between the respective latch sideplates 22a and 22b when the cargo ramp 14 is closed.

The latch body 22 further includes a pair of parallel, upper and lower bores 28 and 30 that pass perpendicularly through both sideplates 22a and 22b above the cross-member 22c, and which extend parallel to the longeron 20 and the edge of the doorway. Slidably engaged in the upper and lower bores 28 and 30 are a cylindrical lock actuator rod 32 and a cylindrical latch actuator rod 34, respectively. The lock and latch rods 32 and 34 include cylindrically curved, concave cam detents 32a and 34a, respectively, which oppose one another and are oriented with their cylindrical axes extending parallel to one another.

The latch body 22 further includes a pair of integral, upright wall members 22d and 22e that extend upwardly from the cross-member 22c between the sideplates 22a and 22b. The wall members 22d and 22e are spaced apart and are parallel to one another, and each extends in a plane that is parallel to a plane defined by the parallel latch and lock rod bores 30 and 28, respectively. The wall members 22d and 22e thus form an upwardly opening channel 36 that is rectangular in cross section, and which extends transversely between, and is centered on, the bores 28 and 30.

Slidably engaged in the transverse channel 36 is a free-floating cylindrical interlock cam 38. Referring particularly to FIG. 7, the interlock cam 38 is oriented such that its cylindrical axis extends perpendicularly to the sidewalls 22d and 22e and is also perpendicular to each of the bores 28 and 30 and the rods 32 and 34. The planar ends of the interlock cam 38 slidably abut the opposing inner faces of the sidewalls 22d and 22e. The interlock cam 38 is free to travel up and down in the channel 36 between the bores 28 and 30. In this regard, the interlock cam 38 is guided and constrained to travel in a vertical path by means of integral guide pins 38a and 38b that project axially from the opposite planar end surfaces of the interlock cam 38 and extend through vertical guide slots 40 and 42 formed in the wall members 22d and 22e, respectively.

The diameter of the cylindrical interlock cam 38 is greater than the minimum spacing between the bores 28 and 30, such that a portion of the interlock cam 38 necessarily intersects one or the other of the bores 28 and 30 at all times. More specifically, the diameter of the cam 38 is greater than the minimum distance between the outer circumferences of the bores 28 and 30, but somewhat less than the spacing between the longitudinal axes of the bores, such that the interlock cam 38 must at all times extend partially into an imaginary projection of one of the bores into the channel 36. The detents 32a and 34a are sized to receive just that portion of the interlock cam that extends into the projection of the respective bore 28 and 30. To accommodate the interlock cam 38, therefore, one or the other, or both, of the lock and latch rods 32 and 34 must be positioned at all times with its respective cam detent aligned with the interlock cam 38 so as to cooperably receive a portion of the interlock cam 38. In this regard, the radius of curvature of the cam detents 32a and 34a is slightly larger than that of the interlock cam 38 so as to result in a cooperable fit between the detents and the interlock cam 38. As will be further discussed below, this arrangement results in an effective mechanical interlock between the lock and latch rods 32 and 34 that obtains certain specific advantages in the operation of the cargo door assembly.

The lock rods 32 of the latch units 18 along each side of the doorway are connected together by mechanical push-pull rod linkages 50 so as to be constrained to move conjointly. Likewise, the latch rods 34 along each side of the doorway are connected by push-pull rod linkages 52 such that all of the latch rods 34 on each side of the doorway are constrained to move conjointly. A pair of hydraulic push-pull actuators 53, one on each side of the doorway, selectively actuate the latch rods 34.

Each latch rod 34 is coupled to a transversely extending radius arm 54 that extends adjacent the latch body 22. The end of each radius arm 54 distal from the latch rod 34 is connected to one end of a latchpin 56 that is slidably engaged in the coaxial bores 24 and 26 of the latch body sideplates 22a and 22b. The upwardly extending bosses 27 of the cargo ramp 14 are aligned with the respective latch units 18 such that the latchpins 56 may be actuated to secure the cargo ramp 14 in the closed position by passing through the bores 24 and 26 of the latch units 18 and through the bores of the respective cargo ramp bosses 27 when the ramp is closed. It will be further noted that when the latchpins are inserted or in a latched position, the cam detents 34a of the latch rods 34 are centered on the interlock cam 38, as shown, for exampe, in FIG. 2; and that the cam detents 34a are removed from alignment with the interlock cam 38 when the latchpin 56 is in a withdrawn, or unlatched, position.

As already noted, the lock rods 32 on each side of the doorway are connected by mechanical linkages 50 for conjoint translational motion. The lock rods 32 along each side of the doorway are actuated upon opening and closing of the cargo door by means of a cam actuation mechanism best shown in FIGS. 5 and 6. As illustrated therein, the lock rod 32 closest to the outer end of the cargo ramp 14, i.e., closest to the cargo door 12, is connected to a push-pull rod 62. The end of the push-pull rod 62 distal from the last locking rod 32 is pivotably connected to the outer end of a radius arm 64. The radius arm 64 extends radially from one end of a pivot pin 66 that is journalled for rotational motion in a mounting member 68 affixed to fixed structure of the fuselage. A second radius arm 70 extends radially from the opposite end of the pivot pin 66 from the radius arm 64. The second radius arm 70 includes at its outer end a cylindrical cam follower 72 journalled for rotational motion. The radius arms 64 and 70 rotate as a unit about the axis of the pivot pin 66, and are spring-biased so as to tend to rotate in a clockwise direction (as viewed in FIG. 5) by means of a failsafe extension coil spring 74 that connects the outer end of the radius arm 64 to a bracket 76 affixed to the longeron 20.

Affixed to the opposite sides of the outer end of the cargo door 12 are a pair of cams 80. Each cam 80 is adapted to engage the respective cam follower 72 when the door is closed. The cam 80 is configured such that closing of the cargo door 12 causes the cam follower 72 and its radius arm 70 to be rotated to the left to the position shown in FIGS. 2 and 5. The cam 80 is further configured such that, when the cargo door 12 is swung upwardly away from its closed position, the cam follower 72 and its radius arm 70 are caused to rotate in a clockwise direction into the position shown in FIG. 3. Thus, when the cargo door 12 is open the cam follower 72 is in the position shown in FIG. 3. The cargo door 12 is also provided with fixed latch hooks 82 that engage cooperable latchpin members 84 extending from the sides of the doorway. The latch hooks 82 and latchpin members 84 limit the range of swinging motion of the door 12 and bear a major portion of the cabin air pressure load when the door 12 is closed, so as to relieve the cam actuation mechanism of such loads.

In ordinary use, cam follower 72, push-pull rod 62, the locking rods 32, and the associated linkages are in either one of two positions, which are referred to hereinafter as the locked position and the unlocked position. Similarly, the latch rods 34 are each ordinarily in one of two positions, referred to as latched and unlatched positions. When the lock rods 32 are in their unlocked position, shown in FIG. 3, each cam detent 32a is aligned with its respective channel 36 and interlock cam 38. In such position, the interlock cam 38 is free to move upwardly into the detent 32a of the locking rod, thereby freeing the latch rod 34 to be freely moved between its latched and unlatched positions.

When the lock rods 32 are in their locked position, as shown in FIGS. 2 and 4, the lock rods 32 are moved rearwardly (i.e., to the left as viewed in FIGS. 2 and 3), such that their detents 32a are not aligned with their respective channels 36 and interlock cams 38. In this position, the interlock cams 38 cannot move upwardly into the detents 32a of the locking rods 32, and therefore are necessarily received in the detents 34a of the latch rods 34, so as to lock the latch rods 34 in their latched positions.

The failsafe spring 74 operates in the event of a failure of the push-pull rod 62 to swing the radius arms 64 and 70, together with the cam follower 72, to an over-center position (i.e., rotated clockwise, or to the right, as viewed in FIG. 5). In the over-center position (not shown), the radius arm 70 is rotated past the position shown in FIG. 5. A stop 70a limits rotation of the radius arm and determines the over-center position in such an event. When the cam follower 72 is in the over-center position as a result of a failure of the push-pull rod 62, the cam follower 72 and radius arms 70 cannot be rotated by interaction with the cam 80. Rather, the radius arm 70 and the cam follower 72 abut the cam 80, but do move in response to such abutment, so as to prevent the cargo door 12 from being fully closed. Thus, a failure of the push-pull rod 62 prevents the plug-type door 12 from being fully closed and thereby prevents the airplane cabin from being pressurized.

In normal operation, opening and closing of the cargo door 12 operates through the cam 80, the cam follower 72 and their associated linkages, to actuate the locking rods 32 between their locked and unlocked positions. Specifically, when the door 12 is closed, the lock rods 32 are moved to their locked positions, and when the door 12 is opened the lock rods are moved to their unlocked positions. It will be appreciated that the locking rods can only be moved between their locked and unlocked positions when the latch rods 34 are in their latched positions, since otherwise the interlock cams 38 engage the lock rods 32 and prevent them from being moved. For example, when the latch rods are in their unlatched positions, their cam detents 34a are not aligned with the interlock cams 38, and the interlock cams 38 therefore lock the lock rods in place. In such an event, it is impossible for the cargo door 12 to be fully closed, since the cam followers 72 are locked in the upright position shown in FIG. 3. Since the cam followers 72 are locked in position, they are not responsive to the cams 80 and therefore merely abut the cams 80 and thereby prevent the door 12 from being fully closed. In this regard, it will be understood that the gap around the door 12 is greater than can be accommodated by the air pressurization pumps carried by the airplane. This further prevents any attempt at pressurization of the airplane cabin, since pressurization cannot proceed unless the plug-type door 12 is fully closed. This effectively precludes the possibility of the door 12 being closed and pressurization initiated while the cargo ramp is closed but unlatched. That is, the cargo ramp must be both closed and latched before the cargo door can be closed and pressurization initiated. This provides an additional safety factor by preventing the possibility of inadvertent human error in leaving the cargo ramp closed but unlatched.

It will be further appreciated that the cargo door must always be opened first and closed last. That is, the cargo door 12 must be opened before the cargo ramp 14 can be deployed. This ensures that the cargo ramp will not be inadvertently deployed with the cargo door 12 left closed, to thereby form a cargo opening of insufficient height to permit safe discharge of personnel or vehicles, either on the ground or during flight. Conversely, the cargo ramp must always be closed before the cargo door is closed. This ensures that pressurization of the airplane cannot take place with the cargo ramp left in an open or partially open position, since the plug-type cargo door must be first closed and because pressurization cannot be effected with the cargo door 12 in the open position.

It will further be appreciated that the cargo door assembly cannot be opened in flight without first depressurizing the airplane. Since the cargo door 12 must be opened first, and because the cargo door 12 is a plug-type door, the interior of the airplane must first be depressurized before the cargo door can be opened. This precludes any possibility of opening either the cargo ramp 14 or the cargo door 12 while the airplane is pressurized in flight.

Although the present invention is described herein with reference to a particular preferred embodiment, it will be understood that various modifications, alterations and substitutions can be made without departing from the spirit of the invention. Therefore, the scope of the invention is defined by the following claims.

The embodiments of the invention in which an exclusive property or privilege is claimed are defined as follows:

1. A latch and lock mechanism for a fuselage door assembly in a pressurizable aircraft, said door assembly having an inwardly opening plug-type closure member and an outwardly opening nonplug-type closure member, comprising:

latch means affixed to fixed structure of the aircraft, push-pull latch actuator rod means operable to actuate said latch means between a latched position securing said said outwardly opening closure member in a closed position and an unlatched position releasing said outwardly opening closure member for opening; and cam interlock means for mechanically interlocking said latch means with said plug-type closure member, said cam interlock means including push-pull lock actuator rod means and means engaging said lock actuator rod means with said plug-type closure member such that said lock actuator rod means is actuated by opening and closing of said plug-type closure member, and an interlock cam that interlocks said lock actuator rod means and said latch actuator rod means, said interlock cam operating to lock said latch actuator rod means with said latch means in said latched position when said plug-type closure member is closed and to unlock said latch actuator rod means when said plug-type closure member is open.

2. The mechanism defined in claim 1 wherein said latch and lock actuator rod means have opposing cam detent surfaces, and further comprising means mounting said interlock cam between said latch and lock actuator rod means.

3. The mechanism defined in claim 1 wherein said cam interlock means includes a body having a pair of spaced-apart parallel bores in which are slidably engaged said latch actuator rod means and said lock actuator rod means, and wherein said body includes a channel extending transversely between and centered on said parallel bores, said interlock cam comprising a free-floating cylindrical cam slidably engaged in said channel for reciprocal movement between said bores, said latch and lock actuator rod means including mutually opposing cylindrically curved detents, and wherein said cylindrical interlock cam has a diameter greater than the distance between said bores such that said interlock cam is constrained to be in engagement at all times with one or both of said cam detents to thereby permit only one of said actuator rod means to be moved at a time.

4. The mechanism defined in claim 3 wherein said push-pull lock actuator rod means is coupled to a movable cam follower, and wherein said plug-type closure member includes a cam engageable with said cam follower to drive said lock actuator rod means in reciprocal motion upon opening and closing of said plug-type closure member.

5. The mechanism defined in claim 3 wherein said latch means includes said body having said parallel bores and carrying said cylindrical interlock cam.

6. A latch and lock mechanism for an aircraft fuselage door assembly wherein an outwardly opening nonplug-type closure member and an inwardly opening plug-type closure member are hinged to the aircraft fuselage along opposite sides of a fuselage doorway such that said closure members meet in the midsection of the doorway when the door assembly is closed, comprising:
  latch means affixed to fixed structure of the aircraft fuselage and positioned to receive and secure said outwardly opening closure member in a closed position, said latch means being selectively deployable between a latched position and an unlatched position by means of an elongated push-pull latch actuator rod operably coupled to said latch means;
  cam interlock means for securing said latch actuator rod with said latch means in said latched state, said cam interlock means including a lock body having first and second spaced-apart bores and a transverse channel extending therebetween, said latch actuator rod being slidably engaged in said first bore and a push-pull lock actuator rod slidably engaged in said second bore, a locking member slidably engaged in said channel, said latch and lock actuator rods having mutually opposing detents each sized to receive a portion of said locking member in locking relationship, and the dimension of said locking member along said channel being greater than the length of said channel between said bores such that said locking member is constrained to be engaged at all times with the detent of one or the other of said actuator rods; and
  cam-actuated linkage means responsive to opening and closing of said plug-type closure member for moving said lock actuator rod between an unlocked position wherein said detent of said lock actuator rod opens into said channel so as to receive said locking member and a locked position wherein said detent of said lock actuator rod is displaced from said channel so as to constrain said locking member to engage and lock said latch actuator rod with said latch means in said latched position, said linkage including a cam mounted on said inwardly opening closure member, said cam being cooperably engageable with a movable cam follower coupled to said lock actuator rod such that said lock actuator rod is moved to said locked position when said inwardly opening closure member is closed and said lock actuator rod is moved to said unlocked position when said inwardly opening closure member is opened.

7. The latch and lock mechanism defined in claim 1 wherein said latch and lock actuator rods are each cylindrical and wherein said detents in said rods comprise concave cylindrically curved detents, and wherein said locking member is a locking cylinder having a cylindrical surface conformable with said cylindrically curved detents.

8. The latch and lock mechanism defined in claim 2 wherein said bores in said lock body are substantially parallel and wherein said locking cylinder is oriented with its cylindrical axis extending transversely to the plane defined by said substantially parallel bores.

9. The latch and lock mechanism defined in claim 1 wherein said latch means comprises a plurality of latches affixed to the fuselage along each side of the doorway, each latch having an associated lock means, and with the latch rods of the latches along each side of the doorway being mechanically linked together for conjoint movement, and with the lock rods of the latches on each side of the doorway also being linked together for conjoint movement.

10. The latch and lock mechanism defined in claim 4 wherein said lock body is integrally formed in the associated latch, and wherein each latch includes a fixed clevis adapted to cooperably receive a bored bracket extending from said outwardly opening closure member, and wherein each latch includes a latchpin coupled to the associated latch actuator rod for securing said bored bracket to said clevis.

11. A latch and lock mechanism for an aircraft cargo door assembly having an inwardly opening cargo door and an outwardly opening cargo ramp, wherein the cargo door and cargo ramp are hinged to the fuselage along opposite sides of a cargo doorway formed in the aircraft fuselage such that the free-swinging ends of the cargo door and cargo ramp approach one another so as to combine to form a closure member in said doorway, comprising a latch body affixed to and extending from fixed structure of the aircraft, said latch body including first and second bores passing therethrough, a lock rod slidably engaged in said first bore and a latch rod slidably enaged in said second bore, said latch body further including a transverse channel therein transecting said first and second bores, and a cylindrical interlock cam slidably engaged for reciprocal movement in said transverse channel, said latch and lock rods including opposing concave cam detents engageable with said interlock cam when said rods are positioned with their respective detents aligned with said channel, said latch rod being operatively connected to latch means for securing said cargo door to said latch body, said latch means and said latch rod being adapted such that said cam detent of said latch rod is aligned with said channel when said latch means is in a latched position, cam actuating means connected to said lock rod, said cam actuating means being responsive to said cargo door to move said lock rod to a position wherein said cam detent of said lock rod is not aligned with said interlock cam when said cargo door is in a closed position, and being further responsive to move said lock rod cam detent into alignment with said interlock cam when said cargo door is opened, the diameter of said interlock cam and the spacing between said bores of said latch body being such that said interlock cam is at all times engaged with at least one of said cam detents of said latch and lock rods.

12. In a pressurizable aircraft fuselage, mutually cooperable adjoining first and second closure members, the first closure member mounted for opening inwardly and the second closure member mounted for opening outwardly of said fuselage from closed positions sealing said fuselage against loss of pressurization, a latch bolt mechanism operable to secure said second closure member in a closed position, said latch bolt mechanism including push-pull latch actuator rod means operable to actuate said latch bolt mechanism between a latched position securing said second closure member and an unlatched position releasing said second closure member, and cam interlock means for mechanically interlocking said latch bolt mechanism with said first closure member, said cam interlock means being actuated by closure of said first closure member, said cam interlock means operating to prevent the release of said latch bolt mechanism until the first closure member is moved out of closed position.

13. The combination defined in claim 12 wherein the cam interlock means is further operable to prevent closing of said first closure member until said latch bolt mechanism has been actuated to a latched position, so as to prevent pressurization of the fuselage until said latch bolt mechanism is actuated to secure said second closure member in its closed position.

14. The combination defined in claim 12 or 13 in which said second closure member comprises an outwardly and downwardly opening loading ramp panel hinged at an edge to said fuselage and said first closure member comprises an inwardly and upwardly opening door panel hinged at an edge of said fuselage relatively opposite the hinged edge of said second closure member.

* * * * *